July 28, 1936.                    J. B. DYER                    2,048,853
                        AUTOMOBILE CONTROL APPARATUS
                Filed Aug. 14, 1933            2 Sheets-Sheet 1

INVENTOR
John B. Dyer
BY
Spencer Hardman and Fehr
ATTORNEY

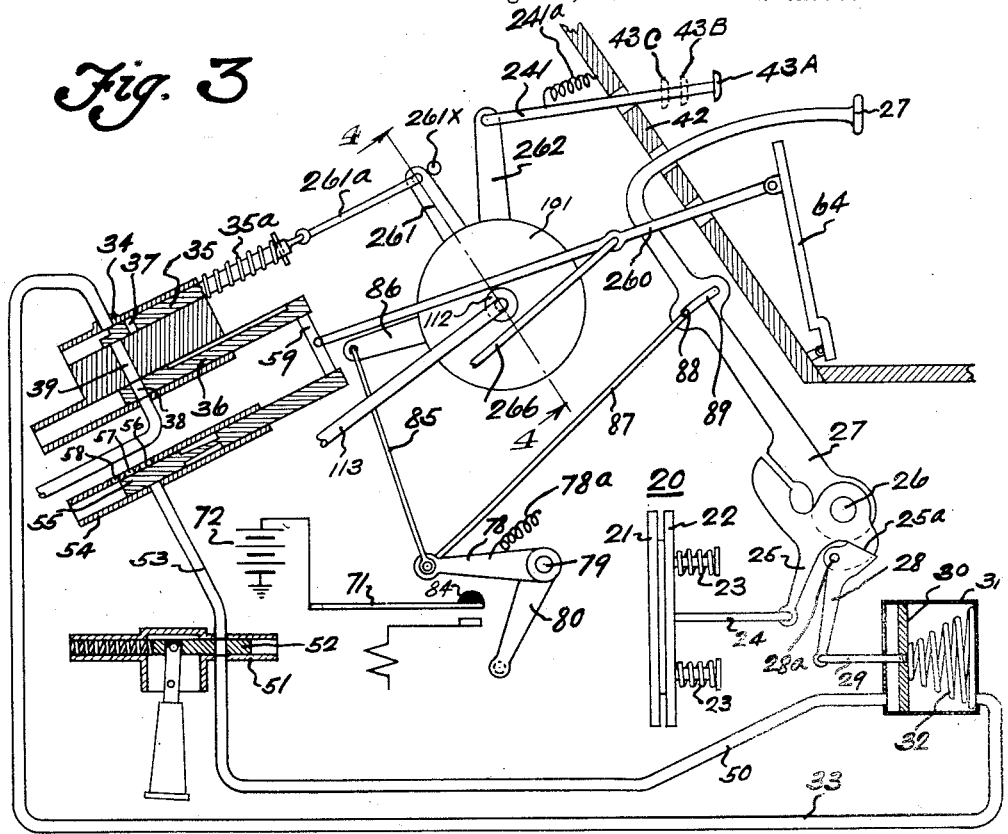

Patented July 28, 1936

2,048,853

UNITED STATES PATENT OFFICE 2,048,853

AUTOMOBILE CONTROL APPARATUS

John B. Dyer, Pendleton, Ind., assignor, by mesne assignments, to General Motors Corporation, Detroit, Mich., a corporation of Delaware Application August 14, 1933, Serial No. 685,005

17 Claims. (Cl. 290—38)

This invention relates to engine starter control apparatus for automotive vehicles and more particularly to engine starter control apparatus of the "coincidental" type in which a member for controlling a function of the vehicle power plant or power transmission is used to control the engine starter, means being provided for preventing operation of the engine starter while the engine is running.

One object of the present invention is to coordinate the engine starter control apparatus with automatic engine-clutch control apparatus operated by the engine, for example by suction produced by the engine. In clutch control apparatus operated by engine suction the practice has been to use an auxiliary pedal to effect the opening of a connection between the engine intake manifold and a suction cylinder so that its cooperating piston will be operated by unbalanced atmospheric pressure to open the clutch in order to permit the shifting of gears, and to use the accelerator or fuel valve operating pedal to effect the closing of said connection between the engine intake manifold and the clutch operating cylinder and the venting of said cylinder so that the clutch will be closed as the engine fuel valve is opened. The present invention embraces the coordination of the engine starter control apparatus with one of the members (the auxiliary pedal member or the accelerator pedal member) which control the engine clutch operating mechanism, and the use of means responsive to engine operation for disconnecting the engine starter control apapratus from the engine-clutch control mechanism.

Incidentally, it is a further object of the invention to positively open the engine-clutch while starting the engine to relieve the starting motor of load of driving the power transmission of the vehicle.

Further objects and advantages of the present invention will be apparent from the following description, reference being had to the accompanying drawings wherein a preferred embodiment of one form of the present invention is clearly shown.

Fig. 1 is a diagram of one form of the present invention.

Fig. 2 is a sectional view on line 2—2 of Fig. 1.

Fig. 3 is a diagram of a modified form of the invention.

Fig. 4 is a sectional view taken on the line 4—4 of Fig. 3.

Figs. 5, 6 and 7 are diagrams showing certain operations of the device shown in Fig. 4.

In Fig. 1 which shows the use of the accelerator pedal for controlling the engine starter as well as for controlling the engine fuel valve and the automatic clutch operating device, the clutch is indicated diagrammatically at 20 and comprises a driving member 21 frictionally engageable with a driven member 22 urged by springs 23 against the member 21. The mechanism for withdrawing the clutch member 22 from the member 21 is shown diagrammatically as comprising a link 24 connected with the member 22 and with a lever 25 pivoted upon a rod 26 which also pivotally supports a pedal lever 27. An operating lever 28 is pivotally attached at 28a to lever 25 and is engageable with a surface 25a of lever 25 so as to transmit motion thereto in one direction. The levers 25, 27 and 28 are so constructed that the lever 25 may be operated by the lever 28 independently of the lever 27, or the lever 25 may be operated by the lever 27 independently of the lever 28. The lever 28 is connected by rod 29 with a piston 30 movable in a cylinder 31 and urged toward the left in the drawing by spring 32. The cylinder 31 is connected by a pipe 33 to a valve body 34 providing for the support of two slide valves, 35 and 36 having ports 37 and 38 respectively. The port 37 controls communication between the pipe 33 and a passage 39 in the valve body 34. Port 38 controls communication between the passage 39 and a pipe 40 connected with the engine intake manifold 114. The valve 35 is operated by a rod 41 which extends through the automobile floor board 42 and terminates in a button 43 operated by the foot of the driver.

The cylinder 31 is vented by a pipe 50 connected with a valve body 51 which slidably supports an acceleration responsive valve 52 controlling communication between the pipe 50 and the pipe 53 connected with a valve body 54 which slidably supports a valve 55 for controlling communication between the pipe 53 and a plurality of ports of varying size 56, 57 and 58. The valve 55 is connected with the valve 36 by a bar 59 which is connected by a rod 60 with a lever 61 which is pivotally supported concentrically with a lever 62 connected by a rod 63 with an accelerator or fuel valve controlling pedal 64 hinged at 65 upon the automobile floor board 42. The lever 62 is connected by a rod 66 with the engine carburetor throttle.

The engine starting apparatus which is coordinated with the throttle operating and clutch controlling mechanism comprises a starting motor 70 which is connected by a switch 71 with a storage battery 72 and which has an armature shaft 73 drivingly connected with a longitudinal shiftable sleeve 74 connected by one-way overrunning clutch 75 with a pinion 76 engageable with an engine flywheel gear 77. The sleeve 74 is shifted longitudinally in order to mesh the pinion 76 with the gear 77 by a lever 78 pivoted at 79 and having a bifurcated arm 80 each branch of which carries a pin 81 received by a grooved collar 82 slidable along the sleeve 74 and urged against a shoulder 74a at the end of the sleeve 74 by a spring 83 which transmits motion yieldingly from the collar 82 to the clutch 75. The lever 78 is adapted to engage a switch actuating button 84 in order to close the switch 71 thereby connecting the battery 72 with the motor 70. The lever 78 is connected by rod 85 with a lever 86 pivoted coaxially with the levers 61 and 62. The lever 78 is connected by rod 87 with a pin 88 which is received by a slot 89 provided by a pedal lever 27. A spring 78a maintains the lever 78 normally in the position shown in the drawings.

By a mechanism now to be described the lever 62 is connected either with the lever 61 or with the lever 86. Referring to Fig. 2 a frame 90 which is supported by the vehicle in a suitable manner supports a stub shaft or stub 91 upon which the levers 86, 62 and 61 are coaxially mounted. For this purpose the lever 61 is provided with a hub 92 pivotally mounted upon a hub 93 of the lever 62. The lever 86 is provided with a hub 94. The lever 62 is provided with a disc-like portion 95 having notches or openings 96 which are engageable either by the tangs 97 provided by the lever 61 or the tangs 98 provided by the lever 86.

The hub 93 is shifted longitudinally in order to connect the lever 62 either with the lever 61 or with the lever 86 by device responsive to engine suction. The suction responsive device comprises a suction chamber 100 provided between a member 101 and a flexible diaphragm 102 having its peripheral edge confined between peripheral flanges provided by the member 101 and by a second member 103 which is fastened to the frame 90. The diaphragm 102 is connected by a rivet 104 with washers 105 and 106 having their peripheral flanges bent away from the diaphragm to avoid flexing the diaphragm around sharp corners of the washers. The shank 107 of the rivet 104 passes loosely through an opening 108 provided in an end wall of the hub 93. The head 109 of the rivet is larger than the opening 108 so that the head 109 may operate to move the hub 93 toward the right against the action of the spring 110 which is operative, when the suction in the chamber 100 falls, to urge the diaphragm 102 toward the left and hence the hub 93 and its lever 62 into the normal position shown in Fig. 2. Coupling members 111 and 112 connect the suction chamber 100 with a pipe 113 connected with the engine intake manifold 114.

The operation of the device is as follows: To start the engine the operator presses the pedal 64 toward the floor board 42 thereby causing the lever 62 to rotate clockwise as viewed in the diagram. Since the lever 62 is normally connected with the lever 86, the later moves clockwise and moves the rod 85 downwardly to impart counter-clockwise rotation to the lever 78 in order to effect the movement of the pinion 76 into mesh with the engine gear 77 and the closing of the switch 71 to cause the engine to be cranked by the starting motor. As soon as the engine fires the operator will release the accelerator pedal 64. When the engine is self operative the suction produced in the engine intake manifold is sufficient to cause the diaphragm 102 to be drawn toward the right thereby causing the lever 62 to be shifted along the stud 91 and to be disconnected from the lever 86 and to be connected with the lever 61. Thereafter while the engine is running the throttle pedal 64 is connected so as to operate the throttle and to control the automobile clutch operating mechanism. The lever 62 which is operated by the pedal 64, cannot be connected with the engine starter operating lever 86 while the engine is running. When notches 96 of lever 62 are in alignment with tangs 98 of lever 86, the suction in chamber 100 is sufficient to prevent movement of lever 96 to connect it with lever 86. In open position of the engine valve giving low suction in chamber 100 at low engine speed, the notches 96 of lever 62 will be out of alignment with tangs 98 of lever 86.

Before shifting gears the operator will press the button or pedal 43 thereby connecting the right-hand end of the clutch operating cylinder 31 with the intake manifold through the pipe 40, port 38, passage 39 and port 37 then in alignment with the passage 39 and the pipe 33. This causes the piston 30 to move toward the right against the action of the spring 32 thereby causing the lever 28 to move the lever 25 in a counter-clockwise direction thereby disconnecting the clutch member 22 from the clutch member 21. After shifting gears the operator uses the accelerator pedal 64 to control the engine fuel valve 115 through the agency of the connected levers 61 and 62 and the valve operating rod 66. When the driver presses the pedal 64 to open the engine fuel valve to cause the engine to accelerate, valves 36 and 55 move downwardly in order to vent the cylinder 31 and to permit the spring 32 to move the piston 30 toward the left thereby permitting the clutch members to reengage due to the action of the springs 23. Thereafter the engine is connected with the driving wheels of the vehicle. When it is desired to coast the operator will release the pedal 64 and press the pedal 43, thereby connecting the cylinder 31 again with the engine intake manifold in order to cause the clutch to be disengaged.

The clutch may be pedally operated at any time by the lever 27. In order that the clutch will not be engaged when cranking the engine the lever 78 is connected with the clutch operating pedal 27 by the link 87 so that, when the engine is being started in response to counterclockwise movement of the lever 78 the lever 27 will be correspondingly moved to cause the clutch to be disconnected. Since the pin 88 on the end of the lever 87 is received by the slot 89 provided by the lever 27 the latter may be moved independently of the starter operating mechanism.

In the form of invention shown in Figs. 3 and 4 the clutch control button 43 is coordinated with the engine starter. All of the mechanism shown in Figs. 3 and 4 are identical with that shown in Figs. 1 and 2 with the exception of such parts as are indicated by reference numbers of the 200 series. The pedal lever 64 is connected directly with the bar 59 by a link 260. The button 43 is connected by a link 241 with a lever 262 which is connectible either with a lever 261 for operating the clutch control valve 35 or with the starter operating lever 86. The mechanism for selectively connecting the lever 262, which corresponds to the lever 62 of Fig. 1, with either the starter operating lever 86 or with the lever 261, is identical with the mechanism shown in Fig. 2 with the following exception: In Fig. 2, the tangs 97 and 98 of the levers 61 and 86 respectively, are normally in alignment but, in the form of invention shown in Figs. 3 and 4, when the button 43 is in the normal position 43A and lever 262 in the corresponding position shown in Fig. 5, tang 98 of lever 86 which normally is received by notch 296 of lever 262 is not in alignment with tang 297 of lever 261. For starter operating purposes the button 43 is moved from the position 43A to the position 43B thereby moving lever 262 to such position that the notch 296 of lever 262 is in alignment with tang 297 of lever 261. During this range of movement of the button 43, the lever 86 and consequently the lever 78 are moved sufficiently to cause the engine starter motor 70 to be connected with the engine and the switch 71 to be closed and the motor to crank the engine. When the engine starts, the suction in the chamber 100 will draw the diaphragm 102 toward the right to withdraw notch 296 of lever 262 from the tang 98 and to cause said notch 296 to receive the tang 297 of lever 261. Immediately the tang 98 is released from lever 262 it will return to normal position due to the action of spring 78a which disconnects the engine starter pinion 76 from the engine fly-wheel gear 77 and opens the starter switch 71. The status of the apparatus, when the engine is running, is shown diagrammatically in Fig. 6.

During the range of movement of button 43 from position 43B to 43C, the lever 261 is moved from the position shown in Fig. 6 to that shown in Fig. 7 in order to move valve 35, connected with lever 261 by link 261a, sufficiently to cause the clutch operating cylinder 31 to be connected with the engine intake manifold. This movement of the button 43 is resisted by the spring 35a which urges the lever 261 against a stop 261x. Therefore as long as the engine is running the range of movement of button 43 is limited between positions 43B and 43C. Button 43 cannot return to position 43A while the engine is running because the vacuum in the chamber 100 is sufficient to maintain the lever 262 in clutched relation to the lever 261. Lever 261, being limited by stop 261x, limits the return of button 43, by the action of spring 35a, to the position 43B. Therefore, while the engine is running, the engine starter cannot be operated by moving the button 43 between the positions 43B and 43C. When the engine stops and the vacuum drops the spring 110 returns the diaphragm 102 to normal position, the lever 262 will be disengaged from the lever 261 and will be reengaged with the lever 86, the spring 241a operating to restore button 43 and lever 262 to normal position in which its notch 296 is in alignment with tang 98 of lever 86.

The vacuum operated clutch control mechanism being per se not a part of the present invention is shown only diagrammatically. It may be stated, however, that, as shown in Fig. 1, cylinder 31 is provided at its left with a one-way air inlet valve 116 which is normally held closed by a spring as is usual in such valves and rod 29 is formed with a vent groove 117. When the suction of the engine manifold becomes effective in cylinder 31 to disengage the clutch members, it is desirable that the disengagement should be rapid; such rapid disengagement is facilitated by valve 116 which permits air to pass from the atmosphere into cylinder 31 on all movements of piston 31 to the right. When piston 30 moves to the left during engagement of the clutch members, valve 116 is closed. Vent groove 117, however, provides for rapid movement of the clutch members during the initial stages of their engagement and, of course, also facilitates rapid movement during the final stages of their disengagement. The final stage of engagement of the clutch members takes place after the vent groove 117 has passed entirely outwardly of the left end of cylinder 31. This final stage of engagement is gentle since pipes 50 and 53 and ports 56, 57 and 58 provide for a much slower escape of air from the chamber at the left of piston 30. It will be noted that such engagement of the clutch members occurs when the pedal 64 is in advanced position, so that valves 36 and 55 will be in position to permit venting of the right chamber of cylinder 31 by atmospheric air which enters pipe 33 by way of groove 123, passage 39 and port 37 and so as to permit escape of air from pipe 53 through ports 56, 57 and 58. Under certain conditions it is desirable to cushion even to a greater extent the final engagement of the clutch members and for this purpose valve 52 is provided between conduits 50 and 53. Valve 52 is controlled by inertia of a pendulum 118 which is fulcrumed at 119 and which is pivotally connected to valve 52 at 120. Spring 121 normally maintains port 122 of valve 52 in alignment with conduits 50 and 53. When the vehicle is being suddenly accelerated, the inertia of pendulum 118 will move valve 52 to the left against the resistance of spring 121 so as to close the passage between pipes 50 and 53; obviously, this will make the final engaging movement of the clutch members much slower and their engagement will thus be cushioned. Operation of valve 52 on sudden deceleration of the vehicle is immaterial since, when this occurs, the clutch members are already in fully engaged position or are being disengaged by the engine suction acting to move piston 30 to the right of cylinder 31 or, if the vehicle is coasting, the clutch members are already in disengaged position and engagement will not occur. For a description in greater detail of the clutch control mechanism to which the present invention relates reference is made to the copending application of George C. Carhart, John P. Heiss and Axel J. Jansson, Serial No. 570,884, filed October 24, 1931.

While the form of embodiment of the present invention as herein disclosed, constitutes a preferred form, it is to be understood that other forms might be adapted, all coming within the scope of the claims which follow.

1. A coordinated engine-clutch control device and engine-starter control device comprising, in combination, an engine fuel valve, an engine clutch, an engine starter, a mechanism operated by the engine for disengaging the clutch, a member for rendering said mechanism operative, a second member for rendering said mechanism inoperative and for controlling the engine fuel valve, an engine starter control mechanism normally connected with one of said members and operable by said one member to effect operation of the engine starter, and means responsive to engine operation for disconnecting the engine starter control mechanism from said one member normally connected therewith.

2. A coordinated engine-clutch control device and engine-starter control device comprising, in combination, an engine fuel valve, an engine clutch, an engine starter, a mechanism operated by the engine for disengaging the clutch, a first member for rendering said mechanism operative, a second member for rendering said mechanism inoperative and for controlling the engine fuel valve, an engine starter control mechanism normally connected with said first member and operable thereby to effect operation of the engine starter, and means responsive to engine operation for disconnecting the engine starter control mechanism from said first member.

3. A coordinated engine-clutch control device and engine-starter control device comprising, in combination, an engine fuel valve, an engine clutch, an engine starter, a mechanism operated by the engine for disengaging the clutch, a member for rendering said mechanism operative, a second member for rendering said mechanism inoperative and for controlling the engine fuel valve, an engine starter control mechanism normally connected with said second member and operable thereby to effect operation of the engine starter, and means responsive to engine operation for disconnecting the engine starter control mechanism from said second member.

4. A coordinated engine-clutch control device and engine-starter control device comprising, in combination, an engine fuel valve, an engine clutch, an engine starter, a mechanism operated by the engine for disengaging the clutch, a member for rendering said mechanism operative, a second member for rendering said mechanism inoperative and for controlling the engine fuel valve, an engine starter control mechanism normally connected with one of said members and operable by said one member to effect operation of the engine starter, means responsive to the operation of the engine starter control mechanism for disengaging the engine clutch independently of the engine operated clutch disengaging mechanism, and means responsive to engine operation for disconnecting the engine starter control mechanism from said one member normally connected therewith.

5. A coordinated engine-clutch control device and engine-starter control device comprising, in combination, an engine fuel value, an engine clutch, an engine starter, a mechanism operated by the engine for disengaging the clutch, a first member for rendering said mechanism operative, a second member for rendering said mechanism inoperative and for controlling the engine fuel valve, an engine starter control mechanism normally connected with said first member and operable thereby to effect operation of the engine starter, means responsive to the operation of the engine starter control mechanism for disengaging the engine clutch independently of the engine operated clutch disengaging mechanism, and means responsive to engine operation for disconnecting the engine starter control mechanism from said first member.

6. A coordinated engine-clutch control device and engine-starter control device comprising, in combination, an engine fuel valve, an engine clutch, an engine starter, a mechanism operated by the engine for disengaging the clutch, a member for rendering said mechanism operative, a second member for rendering said mechanism inoperative and for controlling the engine fuel valve, an engine starter control mechanism normally connected with said second member and operable thereby to effect operation of the engine starter, means responsive to the operation of the engine starter control mechanism for disengaging the engine clutch independently of the engine operated clutch disengaging mechanism, and means responsive to engine operation for disconnecting the engine starter control mechanism from said second member.

7. A coordinated engine-clutch control device and engine-starter control device comprising, in combination, an engine fuel valve, an engine intake manifold, an engine starter, an engine clutch, a suction chamber, a displacement element in the chamber and means operated thereby for disengaging the engine clutch, a member for effecting the connection of said chamber with the engine intake manifold, a second member for effecting disconnection of said chamber from the engine intake manifold and for controlling the engine fuel valve, an engine starter control mechanism normally connected with one of said members and operable by said one member to effect operation of the engine starter, and means responsive to engine operation for disconnecting the engine starter control mechanism from said one member normally connected therewith.

8. A coordinated engine-clutch control device and engine-starter control device comprising, in combination, an engine fuel valve, an engine intake manifold, an engine starter, an engine clutch, a suction chamber, a displacement element in the chamber and means operated thereby for disengaging the engine clutch, a first member for effecting the connection of said chamber with the engine intake manifold, a second member for effecting disconnection of said chamber from the engine intake manifold and for controlling the engine fuel valve, an engine starter control mechanism normally connected with said first member and operable thereby to effect operation of the engine starter, and means responsive to engine operation for disconnecting the engine starter control mechanism from said first member.

9. A coordinated engine-clutch control device and engine-starter control device comprising, in combination, an engine fuel valve, an engine intake manifold, an engine starter, an engine clutch, a suction chamber, a displacement element in the chamber and means operated thereby for disengaging the engine clutch, a member for effecting the connection of said chamber with the engine intake manifold, a second member for effecting disconnection of said chamber from the engine intake manifold and for controlling the engine fuel valve, an engine starter control mechanism normally connected with said second member and operable thereby to effect operation of the engine starter, and means responsive to engine operation for disconnecting the engine starter control mechanism from said second member.

10. A coordinated engine-clutch control device and engine-starter control device comprising, in combination, an engine fuel valve, an engine intake manifold, an engine starter, an engine clutch, a suction chamber, a displacement element in the chamber and means operated thereby for disengaging the engine clutch, a member for effecting the connection of said chamber with the engine intake manifold, a second member for effecting disconnection of said chamber from the engine intake manifold and for controlling the engine fuel valve, an engine starter control mechanism normally connected with one of said members and operable by said one member to effect operation of the engine starter, means responsive to the operation of the engine starter control mechanism for disengaging the engine clutch independently of the engine operated clutch disengaging mechanism, and means responsive to engine operation for disconnecting the engine starter control mechanism from said one member normally connected therewith.

11. A coordinated engine-clutch control device and engine-starter control device comprising, in combination, an engine fuel valve, an engine intake manifold, an engine starter, an engine clutch, a suction chamber, a displacement element in the chamber and means operated thereby for disengaging the engine clutch, a first member for effecting the connection of said chamber with the engine intake manifold, a second member for effecting disconnection of said chamber from the engine intake manifold and for controlling the engine fuel valve, an engine starter control mechanism normally connected with said first member and operable thereby to effect operation of the engine starter, means responsive to the operation of the engine starter control mechanism for disengaging the engine clutch independently of the engine operated clutch disengaging mechanism, and means responsive to engine operation for disconnecting the engine starter control mechanism from said first member.

12. A coordinated engine-clutch control device and engine-starter control device comprising, in combination, an engine fuel valve, an engine intake manifold, an engine starter, an engine clutch, a suction chamber, a displacement element in the chamber and means operated thereby for disengaging the engine clutch, a member for effecting the connection of said chamber with the engine intake manifold, a second member for effecting disconnection of said chamber from the engine intake manifold and for controlling the engine fuel valve, an engine starter control mechanism normally connected with said second member and operable thereby to effect operation of the engine starter, means responsive to the operation of the engine starter control mechanism for disengaging the engine clutch independently of the engine operated clutch disengaging mechanism, and means responsive to engine operation for disconnecting the engine starter control mechanism from said second member.

13. A coordinated engine-clutch control device and engine-starter control device comprising, in combination, an engine fuel valve, an engine intake manifold, an engine-starter, an engine-clutch, a suction chamber, a displacement element in the chamber and means operated thereby for disengaging the engine clutch, valves in series for establishing communication between the engine intake manifold and the displacement chamber, one valve being normally closed and the other normally open, an actuator for opening the normally closed valve, an actuator for closing the normally open valve, a first pedal for operating said first actuator, a second pedal for operating the second actuator and for operating the engine fuel valve, an engine-starter control mechanism, and a device normally connecting said engine-starter control mechanism with one of said pedals, said one pedal being normally disconnected from its valve actuator, said device being responsive to engine operation for disconnecting said one pedal from the engine-starter control mechanism and for connecting said one pedal with its valve actuator.

14. A coordinated engine-clutch control device and engine-starter control device comprising, in combination, an engine fuel valve, an engine intake manifold, an engine starter, an engine-clutch, a suction chamber, a displacement element in the chamber and means operated thereby for disengaging the engine clutch, valves in series for establishing communication between the engine intake manifold and the displacement chamber, one valve being normally closed and the other normally open, an actuator for opening the normally closed valve, a first pedal for operating said actuator, a second pedal for operating the second valve and for operating the engine fuel valve, an engine starter control mechanism, and a device normally connecting said engine-starter control mechanism with the first pedal, said first pedal being normally disconnected from its valve actuator, said device being responsive to engine operation for disconnecting said first pedal from the engine-starter control mechanism and for connecting said first pedal with its valve actuator.

15. A coordinated engine-clutch control device and engine-starter control device comprising, in combination, an engine fuel valve, an engine intake manifold, an engine-starter, an engine-clutch, a suction chamber, a displacement element in the chamber and means operated thereby for disengaging the engine clutch, valves in series for establishing communication between the engine intake manifold and the displacement chamber, one valve being normally closed and the other normally open, a pedal for opening the normally closed valve, an actuator for closing the normally open valve, a second pedal for operating said actuator and for operating the engine fuel valve, an engine-starter control mechanism, and a device normally connecting said engine-starter control mechanism with the second pedal, said second pedal being normally disconnected from its valve actuator, said device being responsive to engine operation for disconnecting said second pedal from the engine-starter control mechanism and for connecting said second pedal with its valve actuator.

16. In a coordinated engine-clutch control device and engine-starter control device, the combination of an operating pedal, a member for operating the engine-clutch control device, a member for actuating the engine-starter control device, and means responsive to the status of engine operation for selectively connecting the pedal with either of said members.

17. In a coordinated engine-clutch control device and engine-starter control device, the combination of an operating pedal, a member for operating the engine-clutch control device, a member for actuating the engine-starter control device normally connected with said pedal, and means responsive to the engine becoming self-operative for disconnecting the pedal from the member which actuates the engine-starter control device, and for connecting the pedal with the member which actuates the engine clutch control device.

JOHN B. DYER.